United States Patent
Bakken et al.

(10) Patent No.: US 10,013,096 B2
(45) Date of Patent: Jul. 3, 2018

(54) TOUCH SENSOR WITH SIMULTANEOUSLY DRIVEN DRIVE ELECTRODES

(71) Applicants: Vemund Kval Bakken, Menlo Park, CA (US); Izhar Bentov, Sunnyvale, CA (US); Vivek Pant, San Jose, CA (US); Shahrooz Shahparnia, Campbell, CA (US)

(72) Inventors: Vemund Kval Bakken, Menlo Park, CA (US); Izhar Bentov, Sunnyvale, CA (US); Vivek Pant, San Jose, CA (US); Shahrooz Shahparnia, Campbell, CA (US)

(73) Assignee: Atmel Corporation, Chandler, AZ (US)

( * ) Notice: Subject to any disclaimer, the term of this patent is extended or adjusted under 35 U.S.C. 154(b) by 0 days.

(21) Appl. No.: 13/654,996

(22) Filed: Oct. 18, 2012

(65) Prior Publication Data

US 2014/0111464 A1    Apr. 24, 2014

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC .... G06F 3/0416; G06F 3/044; G06F 3/03545; H03K 2217/960725; H03K 17/18; H03K 2017/9604
See application file for complete search history.

(56) References Cited

U.S. PATENT DOCUMENTS

| | | | |
|---|---|---|---|
| 5,194,852 A | 3/1993 | More | |
| 7,663,607 B2 | 2/2010 | Hotelling | |
| 7,812,827 B2 * | 10/2010 | Hotelling et al. | ............ 345/173 |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |

(Continued)

FOREIGN PATENT DOCUMENTS

| | | |
|---|---|---|
| WO | 20121292472 | 9/2012 |
| WO | WO 2012/129247 | 9/2012 |

OTHER PUBLICATIONS

U.S. Appl. No. 61/454,936, filed Mar. 21, 2011, Myers.

(Continued)

*Primary Examiner* — Richard Hong
(74) *Attorney, Agent, or Firm* — Baker Botts L.L.P.

(57) ABSTRACT

In one embodiment, a method comprises generating, by a controller, a plurality of drive signals. The method further includes simultaneously transmitting, by the controller, the plurality of drive signals to a plurality of drive electrodes disposed on a touch sensor. The method further includes sensing a sense electrode of a plurality of sense electrodes disposed on the touch sensor. The sensing comprises measuring, for each drive electrode of the plurality of drive electrodes, at least one value indicative of a capacitance between the sense electrode and the drive electrode.

20 Claims, 4 Drawing Sheets

(56) References Cited

U.S. PATENT DOCUMENTS

| | | | |
|---|---|---|---|
| 8,217,902 B2 | 7/2012 | Chang | |
| 8,723,824 B2 | 5/2014 | Myers | |
| 2007/0109274 A1* | 5/2007 | Reynolds | G06F 3/041 345/173 |
| 2008/0158165 A1 | 7/2008 | Geaghan et al. | |
| 2008/0158167 A1* | 7/2008 | Hotelling et al. | 345/173 |
| 2008/0309635 A1 | 12/2008 | Matsuo | |
| 2009/0153500 A1* | 6/2009 | Cho et al. | 345/173 |
| 2009/0315854 A1 | 12/2009 | Matsuo | |
| 2011/0063993 A1* | 3/2011 | Wilson | G06F 3/044 370/254 |
| 2011/0084857 A1* | 4/2011 | Marino | G06F 3/044 341/5 |
| 2011/0175834 A1* | 7/2011 | Han | G06F 3/044 345/173 |
| 2012/0044192 A1* | 2/2012 | Hsu | G06F 3/044 345/174 |
| 2012/0050207 A1 | 3/2012 | Westhues | |
| 2012/0105362 A1 | 5/2012 | Kremin et al. | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0327041 A1* | 12/2012 | Harley | G06F 3/03545 345/179 |
| 2012/0327042 A1 | 12/2012 | Harley et al. | |
| 2013/0076612 A1 | 3/2013 | Myers | |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
V. K. Bakken, U.S. Appl. No. 13/653,247, RCE and Amendment filed Jan. 14, 2016.
V. K. Bakken, U.S. Appl. No. 13/653,247, Non-final Office Action dated Feb. 29, 2016.
V. K. Bakken, U.S. Appl. No. 13/653,247, Non-final Office Action dated Jun. 20, 2014.
V. K. Bakken, U.S. Appl. No. 13/653,247, Response to Non-final Office Action dated Sep. 22, 2014.
V. K. Bakken, U.S. Appl. No. 13/653,247, Final Office Action dated Oct. 29, 2014.
V. K. Bakken, U.S. Appl. No. 13/653,247, RCE and Amendment dated Jan. 30, 2015.
V. K. Bakken, U.S. Appl. No. 13/653,247, Non-final Office Action dated Mar. 12, 2015.
V. K. Bakken, U.S. Appl. No. 13/653,247, Response to Non-final Office Action dated Jun. 12, 2015.
V. K. Bakken, U.S. Appl. No. 13/653,247, Final Office Action dated Jul. 15, 2015.
V. K. Bakken, U.S. Appl. No. 13/653,300, Non-final Office Action dated Sep. 11, 2014.
V. K. Bakken, U.S. Appl. No. 13/653,300, Response to Non-final Office Action dated Dec. 11, 2014.
V. K. Bakken, U.S. Appl. No. 13/653,300, final Office Action dated Mar. 26, 2015.
V. K. Bakken, U.S. Appl. No. 13/653,300, final Office Action dated May 26, 2015.
V. K. Bakken, U.S. Appl. No. 13/653,300, Non-final Office Action dated Jul. 30, 2015.
V. K. Bakken, U.S. Appl. No. 13/653,300, Response to Non-final Office Action dated Nov. 30, 2015.
V. K. Bakken, U.S. Appl. No. 13/653,300, Request for Continued Examination and Amendment filed Nov. 14, 2016.
V. K. Bakken, U.S. Appl. No. 13/653,247, Response to Non-final Office Action filed May 26, 2016.
V. K. Bakken, U.S. Appl. No. 13/653,247, Final Office Action dated Jul. 12, 2016.
V. K. Bakken, U.S. Appl. No. 13/653,247, Response to Final Office Action filed Sep. 12, 2016.
V. K. Bakken, U.S. Appl. No. 13/653,247, Advisory Action dated Sep. 28, 2016.
V. K. Bakken, U.S. Appl. No. 13/653,247, RCE and Amendment filed Oct. 12, 2016.
V. K. Bakken, U.S. Appl. No. 13/653,300, Final Office Action dated Jul. 14, 2016.
V. K. Bakken, U.S. Appl. No. 13/653,300, Response to Final Office Action filed Sep. 14, 2016.
V. K. Bakken, U.S. Appl. No. 13/653,300, Advisory Action dated Oct. 20, 2016.
Bakken et al., U.S. Appl. No. 13/653,247, After Final Response with Pilot Program, dated Jun. 14, 2017.
Bakken et al., U.S. Appl. No. 13/653,247, Advisory Action, dated Jul. 6, 2017.
Bakken et al., U.S. Appl. No. 13/653,247, RCE, dated Jul. 13, 2017.
Bakken et al., U.S. Appl. No. 13/653,300, Final Office Action, dated Jul. 12, 2017.
Bakken et al., U.S. Appl. No. 13/653,247, Non-Final Office Action, dated Dec. 8, 2016.
Bakken et al., U.S. Appl. No. 13/653,247, Response to Non-final Office Action, dated Mar. 8, 2017.
Bakken et al., U.S. Appl. No. 13/653,247, Final Office Action, dated Apr. 14, 2017.
Bakken et al., U.S. Appl. No. 13/653,300, Non-Final Office Action, dated Nov. 29, 2016.
Bakken et al., U.S. Appl. No. 13/653,300, Response to Non-Final Office Action, dated Mar. 29, 2017.

* cited by examiner

TOUCH SENSOR WITH SIMULTANEOUSLY DRIVEN DRIVE ELECTRODES

TECHNICAL FIELD

This disclosure relates generally to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
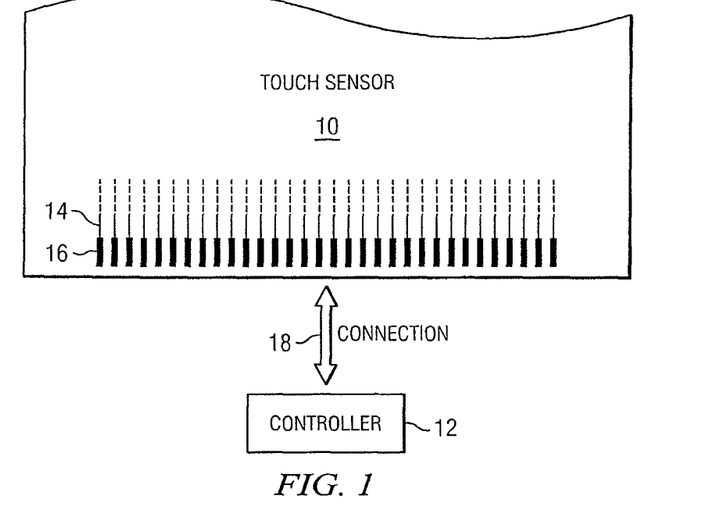
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of a transparent material such as indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of one or more opaque materials such as fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

In particular embodiments, the mechanical stack containing the substrate and the drive or sense electrodes may be formed within a display panel (thus forming an in-cell sensor) or on a display panel (thus forming an on-cell sensor). In an in-cell sensor, the display may be on the same substrate as the drive or sense electrodes. The display panel may be a liquid crystal display (LCD), a light-emitting diode (LED) display, an LED-backlight LCD, or other suitable electronic display and may be visible through the touch sensor 10 that provides the touch-sensitive area. Although this disclosure describes particular display types, this disclosure contemplates any suitable display types.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
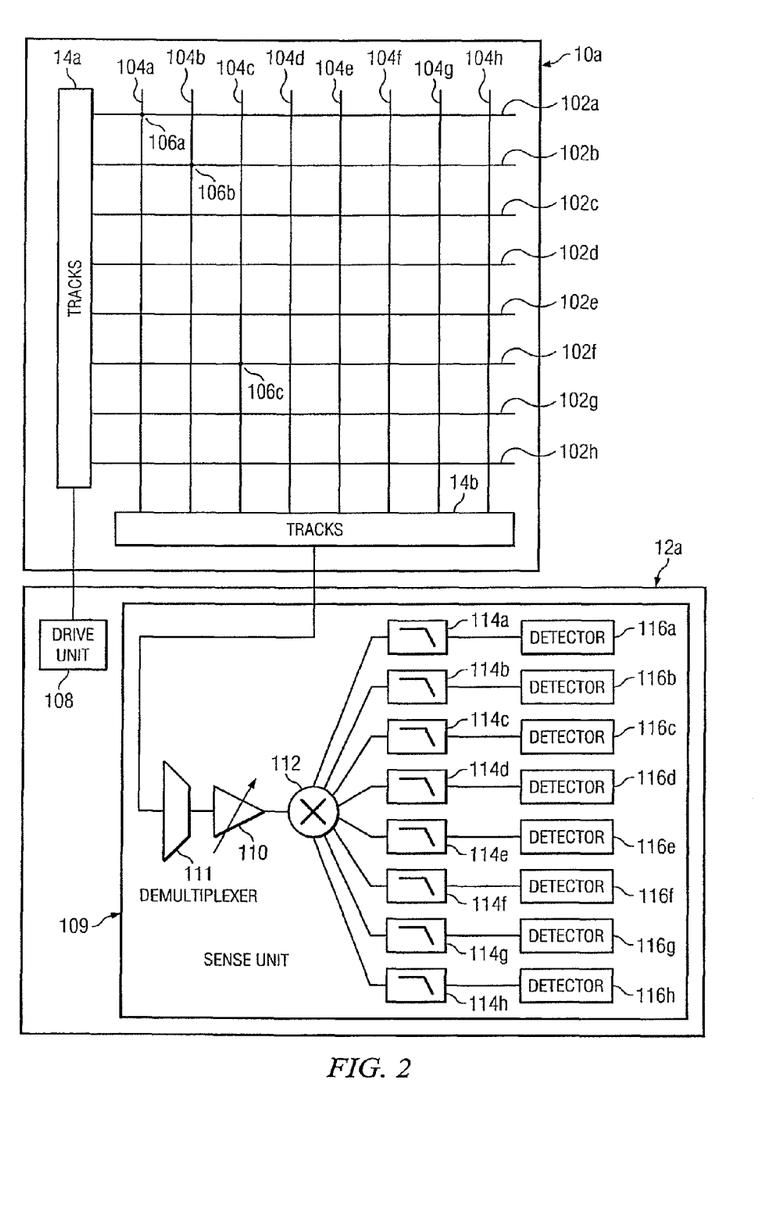
FIG. 2 illustrates the touch-sensor controller of FIG. 1 configured to simultaneously drive a plurality of drive electrodes of the touch sensor of FIG. 1.

FIG. 2 illustrates an example touch-sensor controller 12a configured to simultaneously drive a plurality of drive electrodes 102 of an example touch sensor 10a. Touch sensor 10a also includes a plurality of sense electrodes 104 and tracks 14. Touch-sensor controller 12a includes drive unit 108 and sense unit 109. Touch sensor 10a, drive electrodes 102, sense electrodes 104, tracks 14a and 14b, touch-sensor controller 12a, drive unit 108, and sense unit 109 may respectively have any suitable characteristics of touch sensor 10, the drive electrodes, the sense electrodes, tracks 14, touch-sensor controller 12, the drive unit, and the sense unit described above in connection with FIG. 1.

In operation, controller 12a may supply drive signals to drive electrodes 102 via drive unit 108. In particular embodiments, each of the drive signals has a different dominant frequency. Accordingly, multiple drive electrodes 102 may each be driven at a different frequency. In particular embodiments, multiple drive electrodes 102 are driven simultaneously. The drive signals may capacitively couple from drive electrodes 102 into sense electrodes 104. Accordingly, each sense electrode 104 may carry a sense signal that includes frequency components from multiple drive signals (e.g., the drive signals present on the drive electrodes 102 that intersect with the particular sense electrode 104). In operation, controller 12a may also be operable to sense the sense electrodes 104 using one or more sense units 109. Sense unit 109 may be operable to split the signal received from a sense electrode 104 into multiple signals that each correspond to one of the drive electrodes 102. Thus, each split signal also corresponds to a capacitive node 106 of the sense electrode 104. The split signals may include the frequency components of the drive signal present on the corresponding drive electrode 102. Accordingly, in particular embodiments, a split signal may have the same dominant frequency as the dominant frequency of one of the drive signals. Each of the split signals may be analyzed by sense unit 109 to determine whether the split signal indicates that a touch has occurred at the corresponding capacitive node. Such embodiments allow a plurality of the drive electrodes 102 to be driven simultaneously and sensed simultaneously through one or more sense electrodes 104. These embodiments provide various advantages over implementations that allow driving and sensing of only one drive electrode at a time. For example, for a given amount of time, a greater number of capacitive nodes 106 of touch sensor 10a may be measured. This allows quicker measurement of the capacitive nodes 106 of touch sensor 10a and more accurate touch detection since more samples may be obtained in a given amount of time.

As depicted, touch sensor 10a includes multiple drive electrodes 102a-h. The drive electrodes 102 may be arranged in any suitable configuration. For example, a drive electrode 102 may extend across touch sensor 10a in a line or other suitable shape. In a particular embodiment, a drive electrode 102 extends across a portion of touch sensor 10a in a particular direction. For example, in the embodiment depicted, each drive electrode 102 extends across touch sensor 10a in a horizontal direction. Touch sensor 10a may include any suitable number of drive electrodes 102. In particular embodiments, each drive electrode 102 is electrically isolated from each other drive electrode 102. That is, an electrically conductive element does not couple a drive electrode 102 to another drive electrode 102.

Touch sensor 10a also includes multiple sense electrodes 104a-h. The sense electrodes 104 may be arranged in any suitable configuration. For example, a sense electrode 104 may extend across touch sensor 10a in a line or other suitable shape. In a particular embodiment, a sense electrode 104 extends across a portion of touch sensor 10a in a particular direction. For example, in the embodiment depicted, each sense electrode 104 extends across touch sensor 10a in a vertical direction. Touch sensor 10a may include any suitable number of sense electrodes 104. In particular embodiments, each sense electrode 104 is electrically isolated from each other sense electrode 104. That is, an electrically conductive element does not couple a sense electrode 104 to another sense electrode 104.

Capacitive nodes 106 may be formed at the intersection of the drive electrodes 102 and the sense electrodes 104. As described above, an intersecting drive electrode 102 and sense electrode 104 may be capacitively coupled to each other across a space between them. As examples, the intersection between drive electrode 102a and sense electrode 104a forms capacitive node 106a, the intersection between drive electrode 102b and sense electrode 104b forms capacitive node 106b, and the intersection between drive electrode 102f and sense electrode 104c forms capacitive node 106c.

Touch sensor 10a also includes tracks 14a. Tracks 14a couple to drive electrodes 102 and facilitate connection of the drive electrodes 102 to touch-sensor controller 12a. For example, as described above, each track 14a may couple one or more drive electrodes 102 to a connection pad (such as connection pad 16 described above) of touch sensor 10a. A connector (such as connection 18 described above) may couple the connection pad to touch-sensor controller 12a. Touch sensor 10a may include any suitable number of tracks 14a. For example, touch sensor 10a may include a track 14a for each drive electrode 102. As another example, at least one of the tracks 14a may be coupled to multiple drive electrodes 102 such that there are more drive electrodes 102 than tracks 14a.

Touch sensor 10a also includes tracks 14b. Tracks 14b couple to sense electrodes 104 and facilitate connection of the sense electrodes 104 to touch-sensor controller 12a. For example, as described above, each track 14b may couple one or more sense electrodes 104 to a connection pad (such as connection pad 16 described above) of touch sensor 10a. A connector (such as connector 18 described above) may couple the connection pad to touch-sensor controller 12a. Touch sensor 10a may include any suitable number of tracks 14b. For example, touch sensor 10a may include a track 14b for each sense electrode 104. As another example, at least one of the tracks 14b may be coupled to multiple sense electrodes 104 such that there are more sense electrodes 104 than tracks 14b.

As depicted, touch-sensor controller 12a includes drive unit 108. Drive unit 108 is coupled to drive electrodes 102 via tracks 14a. Drive unit 108 is operable to generate drive signals and transmit the drive signals to the drive electrodes 102. Drive unit 108 may generate any suitable drive signals. A drive signal may include a sin wave, a square wave, a triangle wave, a wave with periodic pulses, or other suitable signal having shaped pulses. The drive signal may have any suitable dominant frequency. The dominant frequency is the frequency at which the spectrum content of the drive signal is the greatest. In particular embodiments, a drive signal may include spectrum content at the dominant frequency of the drive signal and at any suitable number of harmonics of the dominant frequency.

In particular embodiments, drive unit 108 generates multiple different drive signals that each have a different dominant frequency. Each drive signal may be transmitted from drive unit 108 to a set of one or more drive electrodes 102. In a particular embodiment, a plurality of drive electrodes 102 are each simultaneously driven by a separate drive signal. Accordingly, each drive electrode 102 of at least a subset of the drive electrodes 102 of touch sensor 10a may be driven by a drive signal having a dominant frequency that is different from the dominant frequency of each other drive signal. In various embodiments, each drive electrode 102 of touch sensor 10a is simultaneously driven by a separate drive signal having a dominant frequency that is different from the dominant frequencies of the other drive signals. In particular embodiments, groups of drive electrodes 102 are successively driven by drive signals having different dominant frequencies. Thus, a first group of drive electrodes 102 (e.g., drive electrodes 102a-d) may be driven with four drive signals that each have a different dominant frequency for a first period of time, then a second group of drive electrodes (e.g., drive electrodes 102e-h) may be driven with four drive signals that each have a different dominant frequency for a second period of time, and so on. In particular embodiments, the set of drive signals that drive a group of drive electrodes 102 may have the same dominant frequencies as the other sets of drive signals used to drive the other groups.

Figure 3:
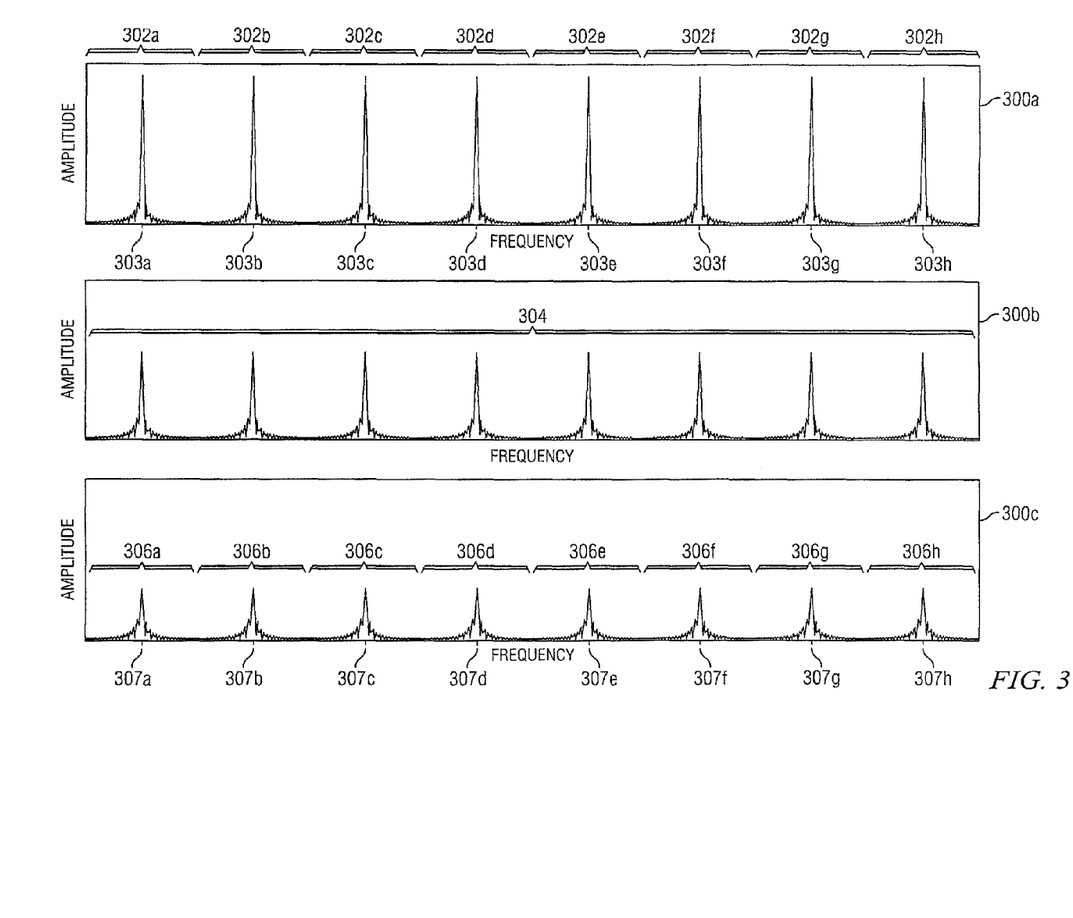
FIG. 3 illustrates example waveforms of drive signals transmitted to the drive electrodes of the touch sensor of FIG. 2 and example waveforms of signals sensed by the touch-sensor controller of FIG. 2.

FIG. 3 depicts frequency domain representations 300 of various drive signals that may be generated by drive unit 108 and sense signals that may be analyzed by controller 12a. The horizontal axes of representations 300 depict frequency and the vertical axes depict the amplitude of the power of the signals represented. Frequency domain representation 300a includes waveforms 302 of a plurality of drive signals that may be generated by drive unit 108. For example, waveform 302a depicts the frequency content of a first drive signal that has a dominant frequency at 303a, waveform 302b depicts the frequency content of a second drive signal that has a dominant frequency at 303b, and so on. As depicted in representation 300a, each drive signal has a different dominant frequency.

In particular embodiments, each drive signal generated by drive unit 108 is transmitted to a set of one or more drive electrodes 102. For example, the drive signal represented by waveform 302a may be transmitted to drive electrode 102a, the drive signal represented by waveform 302b may be transmitted to drive electrode 102b, the drive signal represented by waveform 302c may be transmitted to drive electrode 102c, and so on. As another example, a single drive signal may be transmitted to multiple drive electrodes 102 in succession. For example, if the drive signals represented by waveforms 302e-h are omitted, the drive signal represented by waveform 302a may be transmitted to drive electrodes 102a and then 102e, the drive signal represented by waveform 302b may be transmitted to drive electrodes 102b and then 102f, the drive signal represented by waveform 302c may be transmitted to drive electrodes 102c and then 102g, and the drive signal represented by waveform 302d may be transmitted to drive electrodes 102d and then 102h. Thus in various different embodiments, multiple drive electrodes 102 of touch sensor 10a are simultaneously driven with drive signals having different dominant frequencies.

When the drive signals are received by drive electrodes 102, the drive signals may capacitively couple into the sense electrodes 104. For example, a portion of each drive signal carried by a drive electrode 102 may be capacitively coupled into a sense electrode that intersects with the drive electrodes 102, such as sense electrode 104a. Frequency domain representation 300b of FIG. 3 depicts a waveform 304 of a sense signal that may be present on one of the sense electrodes, such as sense electrode 104a. As depicted, waveform 304 includes attenuated frequency components from each of the drive signals depicted in waveform 300a. Accordingly, the sense signal includes frequency components at each of the dominant frequencies 303 of the drive signals depicted in 300a.

Sense unit 109 is operable to receive at least one sense signal from at least one sense electrode 104, sense charge at the capacitive nodes 116 associated with the sense electrode 104, and provide measurement signals representing capacitances at the capacitive nodes 116. In particular embodiments, any one or more of these functions may be performed concurrently with the transmission of the drive signals to the drive electrodes 102. In the embodiment depicted, sense unit 109 includes receiver front end 110, demultiplexer 111, frequency splitter 112, a plurality of filters 114a, and a plurality of detectors 116. The various components of sense unit 109 may be implemented by software, hardware, or a combination thereof.

Demultiplexer 111 is operable to pass a sense signal from a sense electrode 104 to receiver front end 110. For example, demultiplexer 111 may receive sense signals from a plurality of sense electrodes 104 and select one sense electrode 104 at a time to be passed to receiver front end 110. In particular embodiments, demultiplexer 111 allows a single set of hardware or software (e.g., receiver front end 110, frequency splitter 112, filters 114, and detectors 116) to analyze sense signals from multiple different sense electrodes 104. As an alternative, demultiplexer 111 may be omitted and each sense electrode 104 may be coupled directly to its own sense unit 109 such that the sense signals of the sense electrodes 104 may be analyzed simultaneously by multiple sense units 109 instead of in succession by a single sense unit 109. As another alternative, controller 12a may include multiple sense units 109 and a demultiplexer 111 for each sense unit 109 that allows the sense unit 109 to analyze a plurality of sense signals in succession.

Receiver front end 110 may receive a sense signal from a sense electrode 104 and perform any suitable processing of the sense signal. For example, receiver front end 110 may integrate or aggregate the sense signal, amplify the sense signal, or equalize the sense signal (e.g., amplify or attenuate one or more portions of the drive signals in order to compensate for channel characteristics of sense electrode 104 that affect the drive signals differently). In particular embodiments, the sense signal may be integrated using a timescale that is small enough to preserve the frequency content information contained in the sense signal. In particular embodiments, receiver front end 110 is a low noise amplifier with an adjustable gain. In various embodiments, receiver front end 110 includes a bandpass filter that is operable to pass a range of frequencies that includes the dominant frequencies of the drive signals but filter frequencies outside of this range.

Frequency splitter 112 is operable to receive a signal and demodulate the signal. For example, frequency splitter 112 may receive a processed sense signal from receiver front end 110 and break out the signal into multiple signals that each carry a portion of the frequency content of the processed sense signal. In particular embodiments, frequency splitter 112 may demodulate the signal by multiplying the signal with a weight matrix. The demodulated signals may then pass through filters 114 that remove unwanted noise or amplify the signals before they are passed to detectors 116. In a particular embodiment, filters 114 are narrow active filters.

Frequency domain representation 300c of FIG. 3 depicts waveforms 306 for each of the sense signals that are passed to detectors 116. After demodulation and filtering, each signal represents the portion of a drive signal that was capacitively coupled into the sense electrode 104. Accordingly, each signal represented by a waveform 306 may correspond to a drive electrode 104 and the capacitive node 106a formed by the intersection of the sense electrode 104 and the particular drive electrode 102. For example, the signal represented by waveform 306a corresponds to drive electrode 102a and capacitive node 106a, the signal represented by waveform 306b corresponds to drive electrode 102b and the capacitive node formed by the sense electrode 104 and drive electrode 102b.

Detectors 116 may process these signals and determine at least one value indicative of a capacitance of the respective capacitive node 106. For example, detector 116 may measure an amount of charge of the signal, a voltage level of the signal, a phase delay of the signal, or other suitable characteristic of the signal. Detectors 116 may, alone or in combination with other hardware or software, determine a change in capacitance (or lack thereof) at the respective capacitive node 106. For example, detector 116 may detect a change in amplitude of the signal at its input relative to a normal level of the signal and determine that the capacitance at the capacitive node 106 has changed relative to a previous measurement. Touch-sensor controller may analyze the results of multiple detectors 116 to determine a location of one or more touches or proximity inputs. Detector 116 may use any suitable techniques for determining where a touch or proximity input has occurred.

In particular embodiments, controller 12a may also be operable to detect whether a touch occurring at a capacitive node 106 is caused by an active stylus or a passive object, such as a human finger. In particular embodiments, an active stylus used in combination with touch sensor 10a may generate an electrical signal having any suitable characteristics of the drive signals described above. In a particular embodiment, the signal generated by the active stylus has a dominant frequency that is different from the drive signals transmitted to the drive electrodes 102. The signal generated by the active stylus may capacitively couple into one or more sense electrodes 104 and this coupling may be detected by controller 12a. For example, frequency splitter 112 and an additional filter 114 may isolate the signal generated by the active stylus and feed this signal to a detector 116 which may determine whether or not a touch measured by the other detectors 116 was caused by an active stylus.

Figure 4:
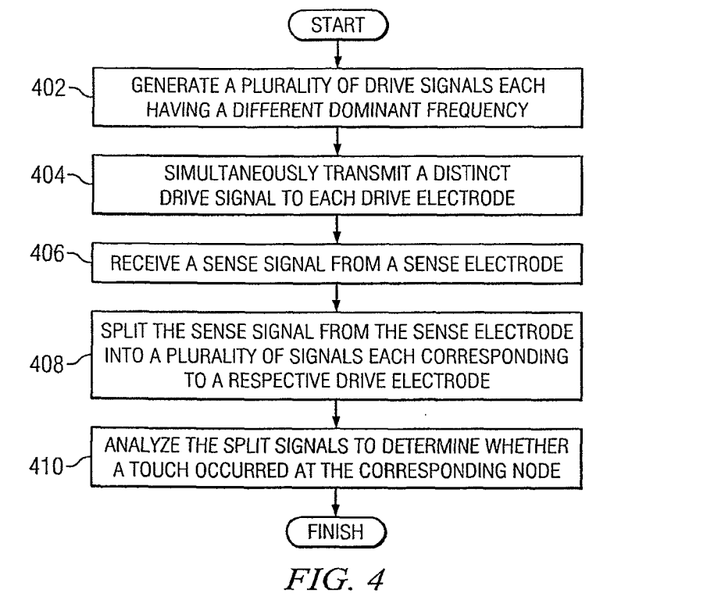
FIG. 4 illustrates an example method for simultaneously driving a plurality of drive electrodes and sensing a sense electrode of the touch sensor of FIG. 2.

FIG. 4 illustrates an example method for simultaneously driving a plurality of drive electrodes 102 and sensing a sense electrode 104. The method begins at step 402 where a plurality of drive signals are generated. Each of the drive signals may have a different dominant frequency. The drive signals may be generated by a drive unit 108 of a touch-sensor controller 12a. At step 404, the drive signals are simultaneously transmitted to drive electrodes 102. Each drive electrode 102 may be driven at a unique frequency. Accordingly, multiple drive electrodes 102 may be driven simultaneously with different frequencies. Each of the drive signals carried by the drive electrodes 102 may capacitively couple into one or more sense electrodes 104 that intersect with the drive electrodes 102.

At step 406, a sense signal is received from a sense electrode 104. The sense signal may include frequency components from each of the drive signals. After reception of the sense signal, any suitable processing may be performed to the sense signal. For example, the sense signal may be amplified, filtered, equalized, or otherwise processed. The processed signal is then passed to a frequency splitter.

At step 408, the sense signal is split into a plurality of signals that each correspond to one of the drive electrodes 102 driven at step 404. Accordingly, each split signal also corresponds to a capacitive node 106 formed by the respective drive electrode 102 and the sense electrode 104. At step 410, the split signals are analyzed to determine whether a touch occurred at the corresponding capacitive nodes 106. For example, a change in amplitude of the split signal relative to a previous measurement of the same capacitive node 106 may indicate that the capacitance at the node has changed. A change in capacitance may indicate that a touch has occurred at the relevant capacitive node 106. The split signals may also be compared with other split signals to determine where a touch has occurred. Step 410 may also involve analyzing one of the split signals to determine whether a touch was performed by an active stylus or a passive object. For example, if the amplitude of the split signal that corresponds to the dominant frequency of the active stylus is above a predetermined threshold, it may be determined that the touch was caused by the active stylus rather than a passive object. In particular embodiments, multiple sense electrodes 104 may be sensed simultaneously. Various embodiments provide the ability to detect simultaneous touches at different capacitive nodes 106.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
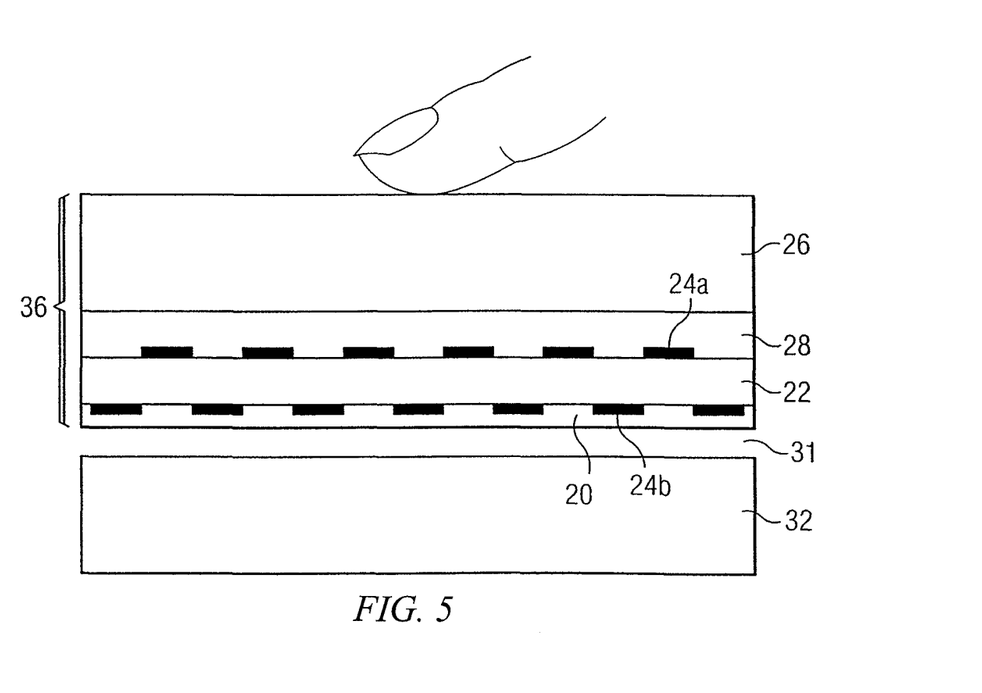
FIG. 5 illustrates an example stack of the touch sensor of FIG. 1.

FIG. 5 illustrates an example stack 36 of touch sensor 10 and a display 32. Stack 36 includes electrodes 24 formed on substrate 22, a cover panel 26 coupled to substrate 22 via a layer of adhesive 28, and a dielectric layer 20 applied to the bottom surface of substrate 22 and conductive material formed thereon. The dielectric layer 20 is configured to interface with display panel 32. For example, as depicted, the dielectric layer 20 may face display panel 32 with an air gap 31 between the dielectric layer 20 and display panel 32.

Particular embodiments of the present disclosure may provide one or more or none of the following technical advantages. In particular embodiments, drive electrodes of a touch sensor may be driven simultaneously. A technical advantage of one embodiment includes the ability to sense multiple capacitive nodes of a sense electrode simultaneously. Another technical advantage of one embodiment may include reducing the amount of time required to sense the capacitive nodes of a touch screen. Another technical advantage of one embodiment may include increasing the number of sense measurements that may be performed in a given amount of time. Another technical advantage includes simultaneously detecting a location of a touch by an active stylus and a different location of a touch by a different object, such as a finger or passive stylus. Certain embodiments of the present disclosure may include none, some, or all of the above technical advantages. One or more other technical advantages may be readily apparent to one skilled in the art in view of the figures, descriptions, and claims of the present disclosure.

Herein, reference to memory or a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A memory or computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, the figures depicted herein are not necessarily drawn to scale and any suitable dimensions may be used for any of the components of the figures. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device comprising:
    a touch sensor comprising:
        a substrate;
        a plurality of drive electrodes disposed on the substrate; and
        a plurality of sense electrodes disposed on the substrate;
    a controller coupled to the plurality of drive electrodes and the plurality of sense electrodes, the controller comprising:
        a drive unit configured to generate a plurality of drive signals that each have a different dominant frequency and simultaneously drive the plurality of drive electrodes with the plurality of drive signals such that each drive electrode of the plurality of drive electrodes is driven with a respective drive signal of the plurality of drive signals that has a different dominant frequency relative to the respective drive signals with which the other drive electrodes of the plurality of drive electrodes are being simultaneously driven; and
        a sense unit comprising:
            a demultiplexer coupled to at least two of the plurality of sense electrodes and configured to select a sense electrode of the plurality of sense electrodes;
            a frequency splitter configured to process a sense signal received from the selected sense electrode to generate a plurality of signals that each correspond to a distinct drive electrode of the plurality of drive electrodes;
            a plurality of filters configured to generate a plurality of filtered signals, each filter coupled to the frequency splitter and corresponding to a distinct drive electrode of the plurality of drive electrodes, each filter configured to receive from the frequency splitter a signal of the plurality of signals generated by the frequency splitter and to remove unwanted noise from or amplify the received signal to generate a filtered signal of the plurality of filtered signals; and
            a plurality of detectors each corresponding to a distinct drive electrode of the plurality of drive electrodes;
            the sense unit configured to sense the selected sense electrode by measuring, for each drive electrode of the plurality of drive electrodes, using the detector corresponding to the drive electrode, and based on the filtered signal of the plurality of filtered signals that corresponds to the drive electrode, at least one value that is indicative of a capacitance between the selected sense electrode and the drive electrode;
    a transparent cover panel overlaying at least a portion of the touch sensor; and
    an electronic display.

2. The device of claim 1, the sense unit further configured to detect the presence of a stylus driven by an electrical signal having a dominant frequency that is different from each of the dominant frequencies of the plurality of drive signals.

3. The device of claim 1, wherein the sense unit is further configured to sense the selected sense electrode by simultaneously measuring, for each drive electrode of the plurality of drive electrodes, the at least one value that is indicative of the capacitance between the selected sense electrode and the drive electrode.

4. The device of claim 1, wherein the sense unit is configured to simultaneously sense at least two of the plurality of sense electrodes.

5. The device of claim 1, wherein the plurality of drive electrodes is a first plurality of drive electrodes and the drive unit is further configured to simultaneously drive each of a second plurality of drive electrodes disposed on the touch sensor during a time that the first plurality of drive electrodes are not driven by the drive unit.

6. The device of claim 1, wherein the frequency splitter is configured to process the sense signal received from the selected sense electrode to generate the plurality of signals that each correspond to a distinct drive electrode of the plurality of drive electrodes by performing operations comprising multiplying the sense signal received from the selected sense electrode with a weight matrix.

7. The device of claim 1, wherein the sense unit is further configured to:
    sense the selected sense electrode by measuring at least one value that is indicative of a capacitance between the selected sense electrode and an active stylus, the active stylus generating an electrical stylus signal having a dominant frequency that is different from each of the dominant frequencies of the plurality of drive signals and that capacitively couples into the selected sense electrode; and
    determine, based at least on the dominant frequency of the electrical stylus signal, that a detected input at the selected sense electrode is caused by an active stylus.

8. The device of claim 7, wherein:
    the frequency splitter is configured to isolate a sense signal received from the selected sense electrode and resulting from the electrical stylus signal capacitively coupling to the selected sense electrode; and
    the sense unit comprises an additional filter coupled to the frequency splitter, the additional filter configured to process the isolated sense signal prior to the sense unit measuring the at least one value that is indicative of the capacitance between the selected sense electrode and the active stylus.

9. The device of claim 1, wherein:
    the sense unit further comprises a receiver front end positioned between the demultiplexer and the frequency splitter, the receiver front end configured to amplify the sense signal received from the selected sense electrode prior to the frequency splitter processing the sense signal received from the selected sense electrode; and
    the frequency splitter is configured to process the sense signal received from the selected sense electrode to generate the plurality of signals that each correspond to the distinct drive electrode of the plurality of drive electrodes by performing operations comprising demodulating the sense signal received from the selected sense electrode.

10. An apparatus comprising:
a drive unit operable to simultaneously drive each of a plurality of drive electrodes disposed on a touch sensor with a drive signal of a plurality drive signals, each of the plurality of drive signals having a different dominant frequency, such that each drive electrode of the plurality of drive electrodes is driven with a respective drive signal of the plurality of drive signals that has a different dominant frequency relative to the respective drive signals with which the other drive electrodes of the plurality of drive electrodes are being simultaneously driven; and
a sense unit comprising:
  a demultiplexer coupled to at least two of a plurality of sense electrodes disposed on the touch sensor and configured to select a sense electrode of the plurality of sense electrodes;
  a frequency splitter configured to process a sense signal received from the selected sense electrode to generate a plurality of signals that each correspond to a distinct drive electrode of the plurality of drive electrodes;
  a plurality of filters configured to generate a plurality of filtered signals, each filter coupled to the frequency splitter and corresponding to a distinct drive electrode of the plurality of drive electrodes, each filter configured to receive from the frequency splitter a signal of the plurality of signals generated by the frequency splitter and to remove unwanted noise from or amplify the received signal to generate a filtered signal of the plurality of filtered signals; and
  a plurality of detectors each corresponding to a distinct drive electrode of the plurality of drive electrodes;
  the sense unit configured to sense the selected sense electrode by measuring, for each drive electrode of the plurality of drive electrodes, using the detector corresponding to the drive electrode, and based on the filtered signal of the plurality of filtered signals that corresponds to the drive electrode, at least one value that is indicative of a capacitance between the selected sense electrode and the drive electrode.

11. The apparatus of claim 10, wherein simultaneously driving each of the plurality of drive electrodes comprises driving each of the plurality of drive electrodes with a distinct drive signal of a plurality of drive signals generated by the drive unit.

12. The apparatus of claim 10, wherein the sense unit is further configured to detect the presence of a stylus driven by an electrical signal having a dominant frequency that is different from each frequency of a plurality of dominant frequencies of a plurality of drive signals used to drive the plurality of drive electrodes.

13. The apparatus of claim 10, wherein the sense unit is further configured to sense the selected sense electrode by simultaneously measuring, for each drive electrode of the plurality of drive electrodes, the at least one value indicative of the capacitance between the selected sense electrode and the drive electrode.

14. The apparatus of claim 10, wherein the sense unit is configured to simultaneously sense at least two of the plurality of sense electrodes.

15. The apparatus of claim 10, wherein the plurality of drive electrodes is a first plurality of drive electrodes and the drive unit is further configured to simultaneously drive each of a second plurality of drive electrodes disposed on the touch sensor during a time that the first plurality of drive electrodes are not driven by the drive unit.

16. The apparatus of claim 10, wherein the frequency splitter is configured to process the sense signal received from the selected sense electrode to generate the plurality of signals that each correspond to a distinct drive electrode of the plurality of drive electrodes by performing operations comprising multiplying the sense signal received from the selected sense electrode with a weight matrix.

17. A non-transitory computer-readable medium comprising logic, the logic configured to, when executed by one or more processors, cause the one or more processors to perform operations comprising:
generating, by a controller, a plurality of drive signals each having a different dominant frequency;
simultaneously transmitting, by the controller, the plurality of drive signals to a plurality of drive electrodes disposed on a touch sensor to drive each drive electrode of the plurality of drive electrodes with a respective drive signal of the plurality of drive signals that has a different dominant frequency relative to the respective drive signals with which the other drive electrodes of the plurality of drive electrodes are being simultaneously driven;
selecting, by a multiplexer, a sense electrode of a plurality of sense electrodes disposed on the touch sensor;
processing a sense signal received from the selected sense electrode to generate a plurality of signals that each correspond to a distinct drive electrode of the plurality of drive electrodes;
processing, by a plurality of filters, the plurality of signals to generate a plurality of filtered signals, each filter corresponding to a distinct drive electrode of the plurality of drive electrodes, each filter configured to process a signal of the plurality of signals and to remove unwanted noise from or amplify the signal to generate a filtered signal of the plurality of filtered signals; and
sensing the selected sense electrode, the sensing comprising measuring, for each drive electrode of the plurality of drive electrodes, using a detector of a plurality of detectors each corresponding to a distinct drive electrode of the plurality of drive electrodes that corresponds to the drive electrode, and based on the filtered signal of the plurality of filtered signals that corresponds to the drive electrode, at least one value indicative of a capacitance between the selected sense electrode and the drive electrode.

18. The non-transitory computer-readable medium of claim 17, wherein the operations further comprise detecting the presence of a stylus driven by an electrical signal having a dominant frequency that is different from each frequency of a plurality of dominant frequencies of the plurality of drive signals generated by the controller.

19. The non-transitory computer-readable medium of claim 17, wherein processing the sense signal received from the selected sense electrode to generate the plurality of signals that each correspond to a distinct drive electrode of the plurality of drive electrodes comprises multiplying the sense signal received from the selected sense electrode with a weight matrix.

20. The non-transitory computer-readable medium of claim 17, wherein the operations further comprise simultaneously sensing at least two of the plurality of sense electrodes.

* * * * *